United States Patent
Oh et al.

(10) Patent No.: US 7,451,263 B2
(45) Date of Patent: Nov. 11, 2008

(54) SHARED INTERFACE FOR COMPONENTS IN AN EMBEDDED SYSTEM

(75) Inventors: Jong-Hoon Oh, Chapel Hill, NC (US); Rom-Shen Kao, Durham, NC (US)

(73) Assignee: Infineon Technologies AG, Munich (DE)

( * ) Notice: Subject to any disclaimer, the term of this patent is extended or adjusted under 35 U.S.C. 154(b) by 247 days.

(21) Appl. No.: 11/349,631

(22) Filed: Feb. 8, 2006

(65) Prior Publication Data

US 2007/0186061 A1    Aug. 9, 2007

(51) Int. Cl.
G06F 13/14 (2006.01)
(52) U.S. Cl. ..................................... 711/103
(58) Field of Classification Search .............. 711/101, 711/103
See application file for complete search history.

(56) References Cited

U.S. PATENT DOCUMENTS

| | | | |
|---|---|---|---|
| 5,515,333 A | 5/1996 | Fujita et al. | |
| 6,134,631 A * | 10/2000 | Jennings, III | 711/117 |
| 7,139,909 B2 | 11/2006 | Lee | |
| 7,221,615 B2 | 5/2007 | Wallner et al. | |
| 2003/0014688 A1 * | 1/2003 | Wu | 714/7 |
| 2003/0028733 A1 | 2/2003 | Tsunoda et al. | |
| 2005/0027928 A1 | 2/2005 | Avraham et al. | |
| 2006/0294295 A1 | 12/2006 | Fukuzo | |
| 2007/0028030 A1 | 2/2007 | Mahrla et al. | |
| 2007/0033487 A1 | 2/2007 | Ruckerbauer et al. | |
| 2007/0076004 A1 | 4/2007 | Wallner et al. | |
| 2007/0174602 A1 | 7/2007 | Kao | |
| 2008/0007569 A1 | 1/2008 | Kao | |
| 2008/0010418 A1 | 1/2008 | Kao | |
| 2008/0010419 A1 | 1/2008 | Kao | |
| 2008/0010420 A1 | 1/2008 | Kao | |

OTHER PUBLICATIONS

Office Action dated Jun. 6, 2008, from the State Intellectual Property Office of P.R.C. for counterpart Chinese application No. 200710103501.2.

* cited by examiner

*Primary Examiner*—Kevin Ellis
(74) *Attorney, Agent, or Firm*—Patterson & Sheridan, L.L.P.

(57) ABSTRACT

Embodiments of the invention provide a method and apparatus for accessing a non-volatile memory controller and a volatile memory via a shared interface. In one embodiment, the method includes selecting one of the non-volatile memory controller and the volatile memory via shared control signals of the shared interface, wherein the shared control signals are issued to the non-volatile memory controller and the volatile memory. The method also includes issuing commands to the selected one of the non-volatile memory controller and the volatile memory via the shared control signals.

23 Claims, 8 Drawing Sheets

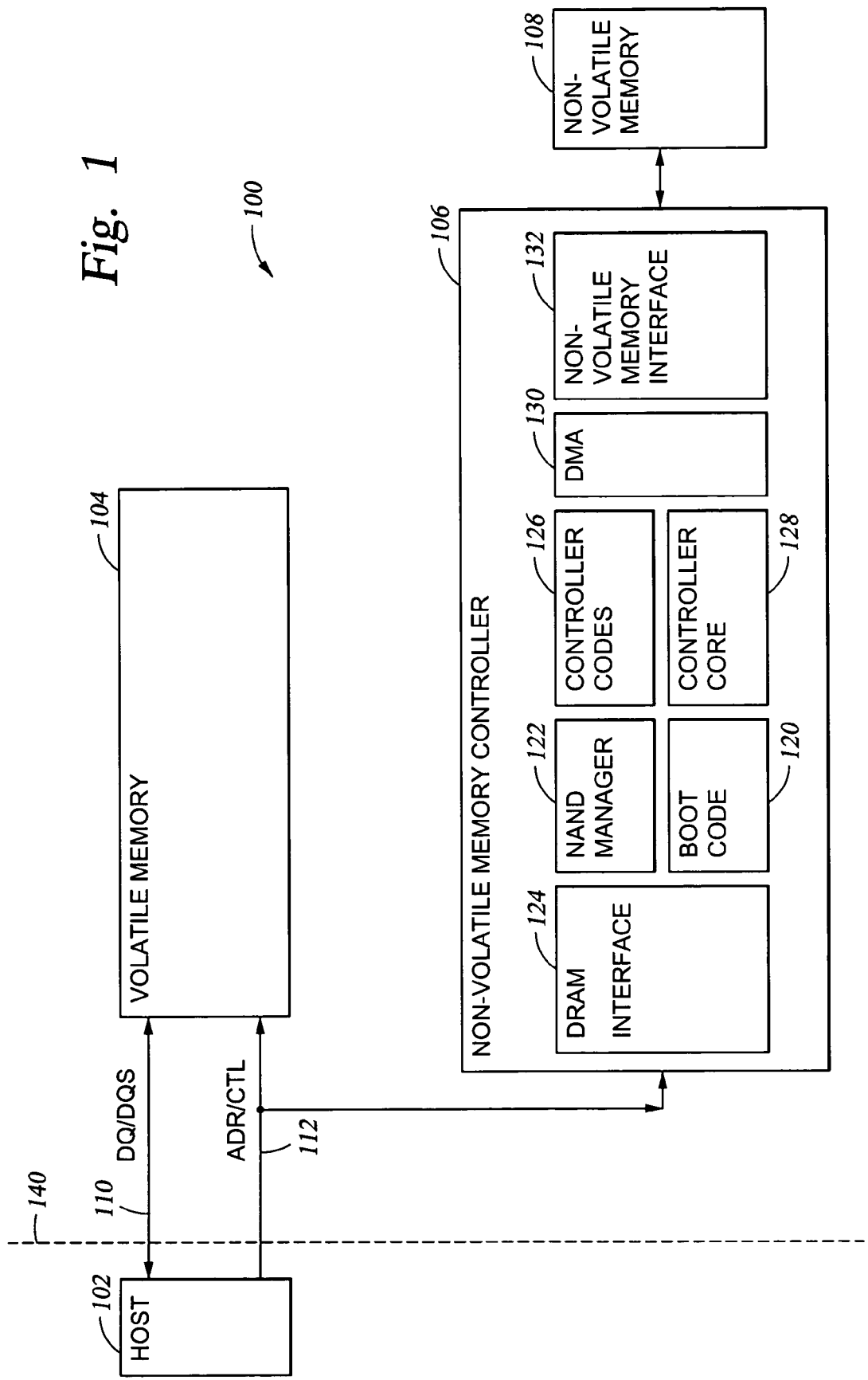

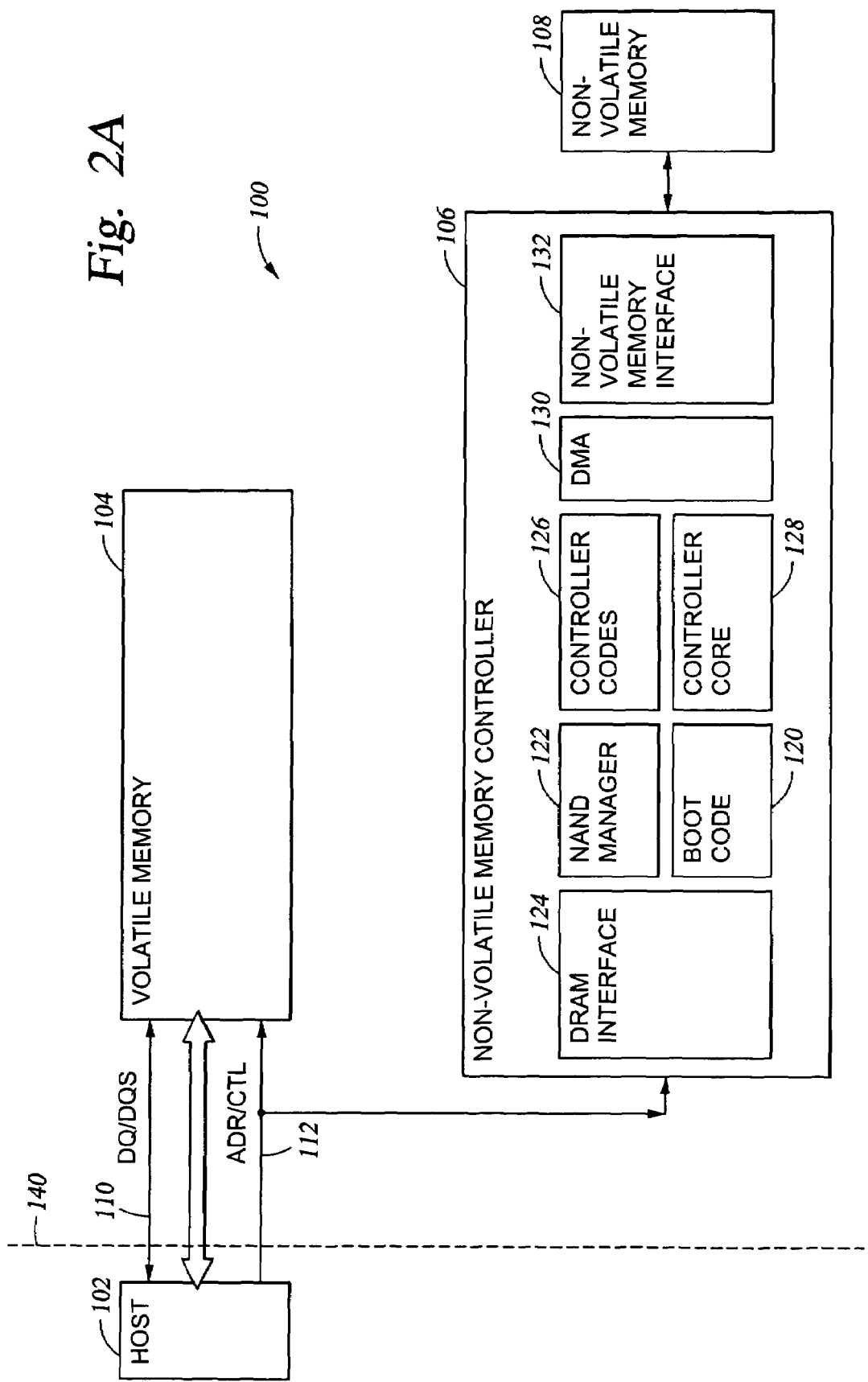

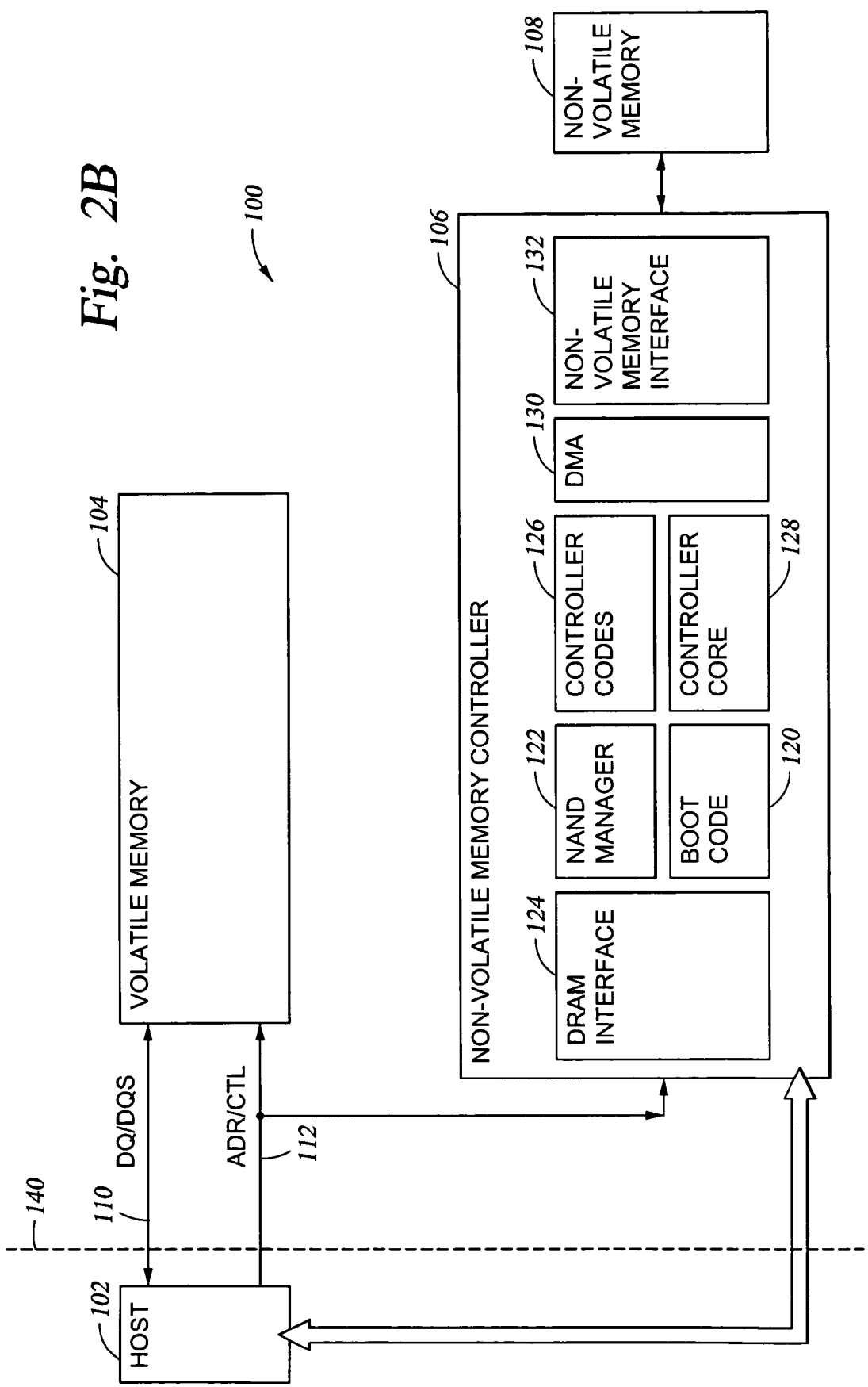

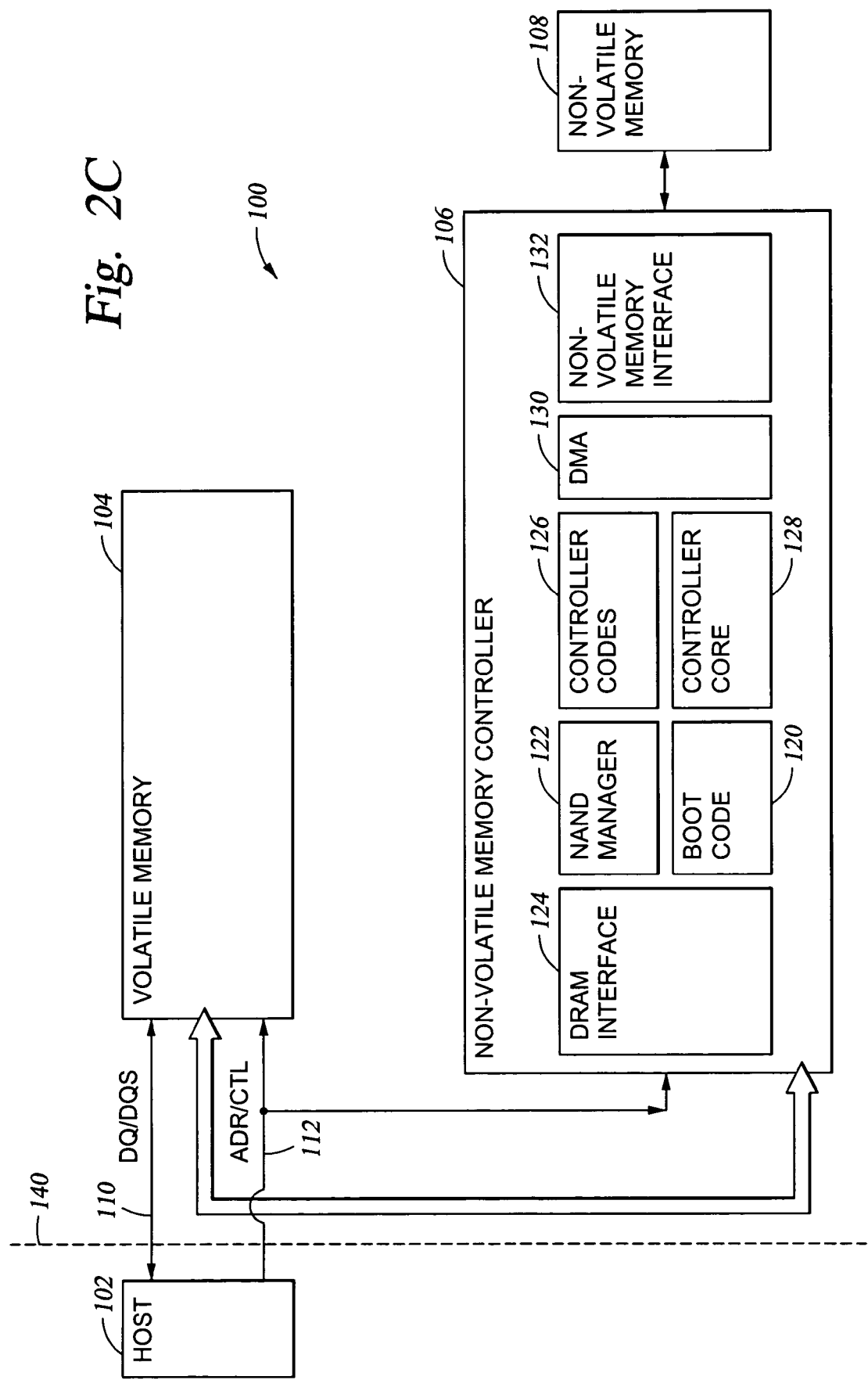

SHARED INTERFACE FOR COMPONENTS IN AN EMBEDDED SYSTEM

BACKGROUND OF THE INVENTION

1. Field of the Invention

The invention generally relates to a computer system. Specifically, the invention relates to an improved system and method for interfacing components in a computer system.

2. Description of the Related Art

Many modern electronic devices such as cell phones, PDAs, portable music players, appliances, and so on typically incorporate an embedded computer system. An embedded computer system typically contains a computer processor (referred to as a host), non-volatile memory (such as a NAND flash memory and/or ROM memory), and volatile memory such as a dynamic random access memory (DRAM). The host may include a central processing unit (CPU), digital signal processor (DSP), microcontroller unit (MCU) or direct memory access (DMA) data transmission device.

In some cases, a non-volatile memory controller (e.g., a NAND flash controller) may be provided for use in accessing the non-volatile memory. By providing a non-volatile memory controller, non-volatile memory control and management tasks may be offloaded from the host to the non-volatile memory controller, thereby simplifying design of the host and allowing the host to handle other processing needs of the embedded system.

Where a host, non-volatile memory controller, non-volatile memory, and volatile memory are provided in an embedded computer system, each component may have one or more interfaces for connecting to other components in the system. To decrease the cost of designing and implementing such an embedded system, and to decrease the power consumption of such an embedded system, there may be a desire to reduce the pin count of the interfaces while maintaining a high level of performance.

Accordingly, what is needed is an improved system and method for interfacing a host, a non-volatile memory controller, and a volatile memory in an embedded computer system.

SUMMARY OF THE INVENTION

Embodiments of the invention provide a method and apparatus for accessing a non-volatile memory controller and a volatile memory via a shared interface. In one embodiment, the method includes selecting one of the non-volatile memory controller and the volatile memory via shared control signals of the shared interface, wherein the shared control signals are issued to the non-volatile memory controller and the volatile memory. The method also includes issuing commands to the selected one of the non-volatile memory controller and the volatile memory via the shared control signals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a block diagram depicting an exemplary system according to one embodiment of the invention.

FIGS. 2A-C depict modes of operation of the system according to one embodiment of the invention.

DETAILED DESCRIPTION OF THE PREFERRED EMBODIMENT

Figure 3:
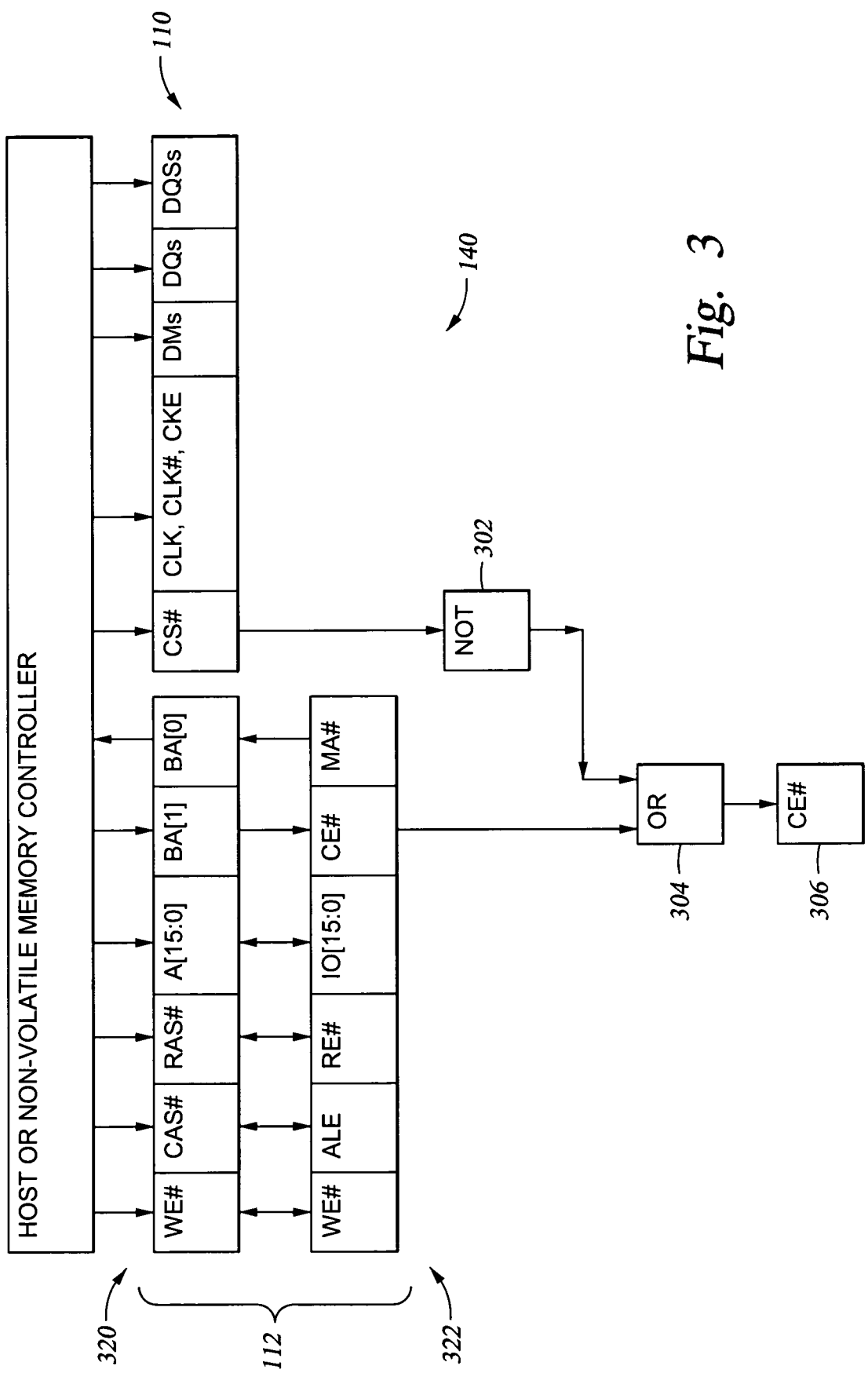
FIG. 3 is a block diagram depicting a shared interface for an embedded system according to one embodiment of the invention.

Embodiments of the invention generally provide a method and apparatus for accessing a non-volatile memory controller and a volatile memory via a shared interface. In one embodiment, the method includes selecting one of the non-volatile memory controller and the volatile memory via shared control signals of the shared interface, wherein the shared control signals are issued to the non-volatile memory controller and the volatile memory. The method also includes issuing commands to the selected one of the non-volatile memory controller and the volatile memory via the shared control signals. In some cases, by sharing control signals issued to the non-volatile memory controller and the volatile memory, the number of pins needed to interface the non-volatile memory controller and the volatile memory may be reduced, thereby reducing complexity and power consumption of the system.

Embodiments of the invention are described below with respect to an embedded system including a host processor, volatile memory, and non-volatile memory. However, in some cases, the embedded system may contain multiple host processors, multiple volatile memories, and/or multiple non-volatile memories. The volatile memories may include any type of DRAM, SRAM, or any other type of volatile memory. The non-volatile memories may include any type of NAND flash memory, NOR flash memory, programmable read-only memory (PROM), electrically-erasable programmable read-only memory (EE-PROM), read-only memory (ROM), or any other type of non-volatile memory. The host processor may include any type of processor, including a central processing unit (CPU), a digital signal processor (DSP), a microcontroller unit (MCU) or a direct memory access (DMA) data transmission device. Also, each chip in the system may in some cases contain multiple types of processors and/or memories. For example, the host may include a CPU, DSP, and SRAM. The non-volatile memory may, in some cases, include a ROM and a flash memory. Other exemplary combinations which may be used with embodiments of the invention should be readily apparent to one of ordinary skill in the art

An Exemplary Embedded System

FIG. 1 is a block diagram depicting an exemplary system 100 according to one embodiment of the invention. As depicted, the system 100 may include a host 102, volatile memory 104 (e.g., a DRAM, SDRAM, DDR-SDRAM, LP-SDRAM, and/or any other type of volatile memory), non-volatile memory controller 106, and non-volatile memory 108 (e.g., a ROM, PROM, EE-PROM, NAND flash memory, NOR flash memory, and/or any other type of non-volatile memory). In some cases, the non-volatile memory controller may contain a boot code buffer 120, NAND manager circuitry 122, DRAM interface 124, controller codes 126, controller core 128, DMA circuitry 130, and a non-volatile memory interface 132.

In one embodiment, the non-volatile memory interface 132 may be used by the non-volatile memory controller 106 to access information stored in the non-volatile memory 108 including boot codes, controller codes, operating system code, application codes, data, and any other information. Similarly, the DRAM interface 124 may be used by the non-volatile memory controller 106 to access the volatile memory 104. As described below, information in the non-volatile memory 108 may be loaded into the boot code buffer 120, controller code buffer 126, and/or volatile memory 104 and used for initialization of the system 100. The controller core 128 may be used to perform controller operations, for example, by running controller codes stored in the controller code buffer 126. Also, as described below, the DMA circuitry 130 may be utilized to automatically transfer information from the non-volatile memory 108 to the volatile memory 104.

In one embodiment of the invention, a shared interface 140 may be utilized by the host 102 to access the non-volatile memory 108 (e.g., via the non-volatile memory controller 106) and the volatile memory 104. As depicted, a portion of the shared interface 140 may include a synchronous serial connection (e.g., a fast connection, DQ/DQS 110) to the volatile memory 104. The shared interface 140 may also include shared address and control lines (ADR/CTL 112) for providing control signals and address bits to the volatile memory 104 and/or non-volatile memory controller 106. Also, other interface connections, described in greater detail below, may also be provided. In some cases, by providing a shared interface 140 for accessing the non-volatile memory controller 106 and the volatile memory 104, no extra pins may be needed to connect the host 102 to the non-volatile memory controller 106. For example, each of the address and control pins connected to the non-volatile memory controller 106 may also be connected to the volatile memory 104.

Modes of Operation Utilizing the Shared Interface

In one embodiment of the invention, the shared interface 140 may be utilized for performing memory accesses in one of a plurality of modes. FIGS. 2A-C depict modes of operation of the system 100 according to one embodiment of the invention.

FIG. 2A is a block diagram depicting a first mode of operation in which the host 102 accesses the volatile memory 104 according to one embodiment of the invention. As depicted, the host 102 may read from or write to the volatile memory via the shared interface 140. Where the host 102 accesses the volatile memory 104, the host 102 may assert signals indicating that the host 102 is acting as master (e.g., the side in the interface 140 which initiates and controls a given communication) on the shared interface 140. By asserting the signals indicating that the host 102 is acting as master on the interface 140, other components connected to the shared interface 140 (e.g., the non-volatile memory controller 106) may not attempt to simultaneously control the interface 140. For example, the host 102 may utilize shared address and control signals 112 to select the volatile memory 104, issue commands to the volatile memory 104, and select an address in the volatile memory 104. In one embodiment, the host 102 may utilize the synchronous serial port 110 (or fast port) to transfer data to and from the volatile memory 104. Exemplary signals utilized in the first mode are described below in greater detail.

FIG. 2B is a block diagram depicting a second mode of operation in which the host 102 accesses the non-volatile memory 108 according to one embodiment of the invention. Where the host 102 accesses the non-volatile memory 108, the host 102 may assert signals indicating that the host 102 is acting as master on the shared interface 140. Also, the host 102 may utilize the shared address and control signals 112 to select the non-volatile memory controller 106, issue commands to the non-volatile memory controller 106, and select an address in the non-volatile memory 108. In response to the commands and/or addresses provided by the host 102 via the shared interface 140, the non-volatile memory controller 106 may access an address in the non-volatile memory 108, e.g., via the non-volatile memory interface 132. In one embodiment, the host 102 may utilize an asynchronous parallel port to pass data between the host 102 and the non-volatile memory controller 106, including data to be written to or data read from the non-volatile memory 108 by the non-volatile memory controller 106. Exemplary signals utilized in the second mode are also described below in greater detail.

FIG. 2C is a block diagram depicting a mode of operation in which the non-volatile memory controller 106 accesses the volatile memory 104 according to one embodiment of the invention. Where the non-volatile memory controller 106 accesses the volatile memory 104, the non-volatile memory controller 106 may assert signals on the shared interface 140 indicating that the non-volatile memory controller 106 is master of the shared interface 140 (e.g., thereby preventing the host 102 from simultaneously utilizing the interface 140). The non-volatile memory controller 106 may then utilize the shared address and control 112 to select the volatile memory 104, issue commands to the volatile memory 104, and select an address in the volatile memory 104. In one embodiment, the non-volatile memory controller 106 may utilize an asynchronous parallel port to pass data between the non-volatile memory controller 106 and the volatile memory 104.

In one embodiment, the non-volatile memory controller may transfer data between the non-volatile memory 108 and the volatile memory 104. For example, where data is transferred from the non-volatile memory 108 to the volatile memory 104, the non-volatile memory controller 106 may utilize the non-volatile memory interface 132 to read data from the non-volatile memory 108. The data read from the non-volatile memory 108 may then be written from the non-volatile memory controller 106 to the volatile memory 104 via the shared interface 140. Data may similarly be read from the volatile memory 104 and written to the non-volatile memory 108 via the shared interface 140 and the non-volatile memory controller 106. In some cases, the non-volatile memory controller 106 may be utilized to perform a direct memory access (DMA) transfer between the non-volatile memory 108 and the volatile memory 104. Exemplary signals utilized in the third mode are also described below in greater detail.

Exemplary Shared Interface

FIG. 3 is a block diagram depicting a shared interface 140 for an embedded system 100 according to one embodiment of the invention. As depicted, the interface 140 may include shared address and controls 112 and connections for a synchronous serial connection 110. As depicted, the interface 140 may be connected to the host 102 or the non-volatile memory controller 106.

In one embodiment, the signals for the synchronous serial connection 110 may include a chip-select signal (CS#, the '#' indicating that the signal may be active-low), a clock signal (CLK), an inverted clock signal (CLK#), a clock enable signal (CKE), a data mask signal (DMs), a serial data signal (DQ), and a serial data strobe signal (DQSs).

The shared address and control signals 112 may include volatile memory connections 320 used to access the volatile memory 104 and non-volatile memory controller connections 322 used to access the non-volatile memory 108 via the non-volatile memory controller 106. In one embodiment, the volatile memory connections 320 may include a write-enable signal (WE#), column-address strobe signal (CAS#), row-address strobe signal (RAS#), an address bus (A[15:0]), and bank address bits (BA[1], BA[0]).

As depicted, the volatile memory connections 320 may also be connected to the non-volatile memory connections 322. Respectively, the WE# connection may be shared between the non-volatile memory connection 320 and the volatile memory controller connection 322, the CAS# connection may be shared with an address latch signal (ALE) for the non-volatile memory controller connection 322, the RAS# signal may be shared with a read-enable signal (RE#) for the non-volatile memory controller connection 322, the address bits A[15:0] may be shared with multiplexed input/output pins IO[15:0] for the non-volatile memory controller connection 322, BA[1] may be shared with a chip-enable signal CE# for the non-volatile memory controller connection 322, and BA[0] may be shared with a master-access signal (MA#) for the non-volatile memory controller connection 322. The corresponding shared connections (with exemplary host pin numbers) are also shown below in Table 1.

TABLE 1

Shared Interface Connections

| Host Pin | Volatile Memory | Non-Volatile Memory Controller |
|---|---|---|
| 0 | WE# | WE# |
| 1 | CAS# | ALE |
| 2 | RAS# | RE# |
| 3:19 | A[15:0] | IO[15:0] |
| 20 | BA[1] | CE# |
| 21 | BA[0] | MA# |

In one embodiment of the invention, the chip-enable signal (CE#) 306 for the non-volatile memory controller 106 may be logically derived from the chip-enable signal CE# of the shared interface 140 and the chip select signal CS#. By deriving the chip enable signal CE# 306 from the CE# and CS# signals, the non-volatile memory controller 106 may determine whether the host 102 is selecting the non-volatile memory controller 106 or the volatile memory 104. In some cases, if the CE# 306 signal were not derived from the CE# and CS# signals, the non-volatile memory controller 106 might react to the shared address and control signals 112 even when the non-volatile memory controller 106 is not selected. For example, when the chip-enable signal CE# is lowered to a low logic level and when the chip-select signal CS# is raised to a high logic level (thereby deselecting the volatile memory 104), then the non-volatile memory controller 104 may be selected (e.g., the chip-enable signal CE# 306 may be lowered).

The selection circuitry may include a NOT gate 302 which inverts the CS# signal and an OR gate 304 which logically-OR's the CE# signal and the inverted CS# signal. The output of the OR gate 304 may be connected to the CE# signal 306. In one embodiment, the circuitry may be provided as separate circuitry from the host 102, volatile memory 104, or non-volatile memory controller 106. Optionally, the host 102 or the non-volatile memory controller 106 may generate the CE# signal 306 with the necessary signals being input or output on an extra pin of the chip generating the signal 306.

Selection of a transfer mode for the shared interface is described below in greater detail with respect to FIGS. 4-5.

Selecting a Mode of Operation in the Shared Interface

In one embodiment of the invention, the host 102 and the non-volatile memory controller 106 may use the CS#, CE#, and MA# signals of the shared interface 140 to select a master for the interface 140 and to select which chip is being controlled via the shared interface 140.

Figure 4:
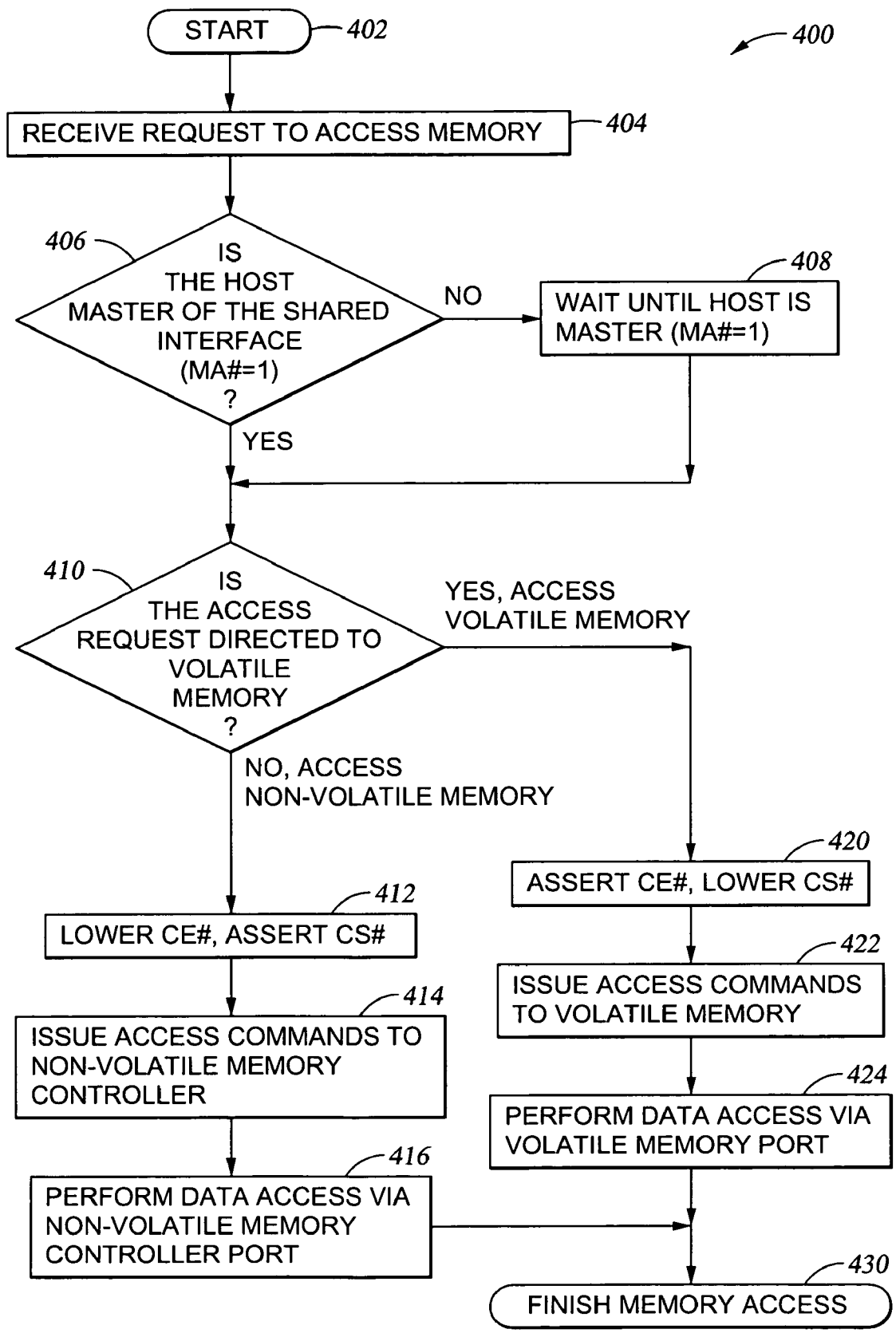
FIG. 4 is a flow diagram depicting a process for using the host to access memory via the shared interface according to one embodiment of the invention.

FIG. 4 is a flow diagram depicting a process 400 for using the host 102 to access memory via the shared interface 140 according to one embodiment of the invention. As depicted, the process 400 may begin at step 402 and continue to step 404 where a request to access memory (e.g., the volatile memory 104 or the non-volatile memory 108). Such a request may be received, e.g., from an external device or as a result of an instruction executed by the host 102.

When the request is received, a determination may be made at step 406 of whether the host 102 is the master of the shared interface 140. The determination may be made, for example, by examining the MA# bit output by the non-volatile memory controller 106. If the MA# bit is lowered, then the non-volatile memory controller 106 may be master of the shared interface 140 and the host 102 may wait until the MA# bit is raised at step 408 by the non-volatile memory controller 106, thereby indicating that the non-volatile memory controller 106 is no longer master of the shared interface 140.

Once the host 102 becomes master of the shared interface 140, a determination may be made at step 410 of whether the access is directed to volatile memory 104. If a determination is made that the access request is directed to volatile memory 104, then the host may assert CE# and lower CS# at step 420. By asserting CE#, the nonvolatile memory controller 106 may be deselected by the host 102. By lowering CS#, the volatile memory 104 may be selected by the host 102. Then, at step 422, the host 102 may issue access commands to the volatile memory 104, e.g., via the shared address and control signals 112 of the shared interface 140. Then, at step 424, a data access may be performed via a port of the volatile memory 104 (e.g., using connections 110 for a synchronous serial port).

If a determination is made that the access request is directed to non-volatile memory 108, then the host may lower CE# and assert CS# at step 412. By lowering CE#, the non-volatile memory controller 106 may be selected by the host 102. By asserting CS#, the volatile memory 104 may be deselected by the host 102. Then, at step 414, the host 102 may issue access commands to the non-volatile memory controller 106, e.g., via the shared address and control signals 112 of the shared interface 140. Then, at step 416, a data access may be performed via a port of the non-volatile memory controller 106 (e.g., using non-volatile memory controller connections 322 for an asynchronous parallel port). The process 400 may then finish at step 430.

In some cases, the non-volatile memory controller 106 may become master of the shared interface 140 and perform data accesses between the non-volatile memory 108 and the volatile memory 104. For example, the non-volatile memory controller 106 may utilize the shared interface 140 to read data from the volatile memory 104 and then utilize the non-volatile memory interface 132 to the data to the non-volatile memory 108. The non-volatile memory controller 106 may also utilize the non-volatile memory interface 132 to read data from the non-volatile memory 108 and then write the data to the volatile memory 104 via the shared interface 140. In some cases, the non-volatile memory controller 106 may perform a DMA transfer between the non-volatile memory 108 and the volatile memory 104.

Figure 5:
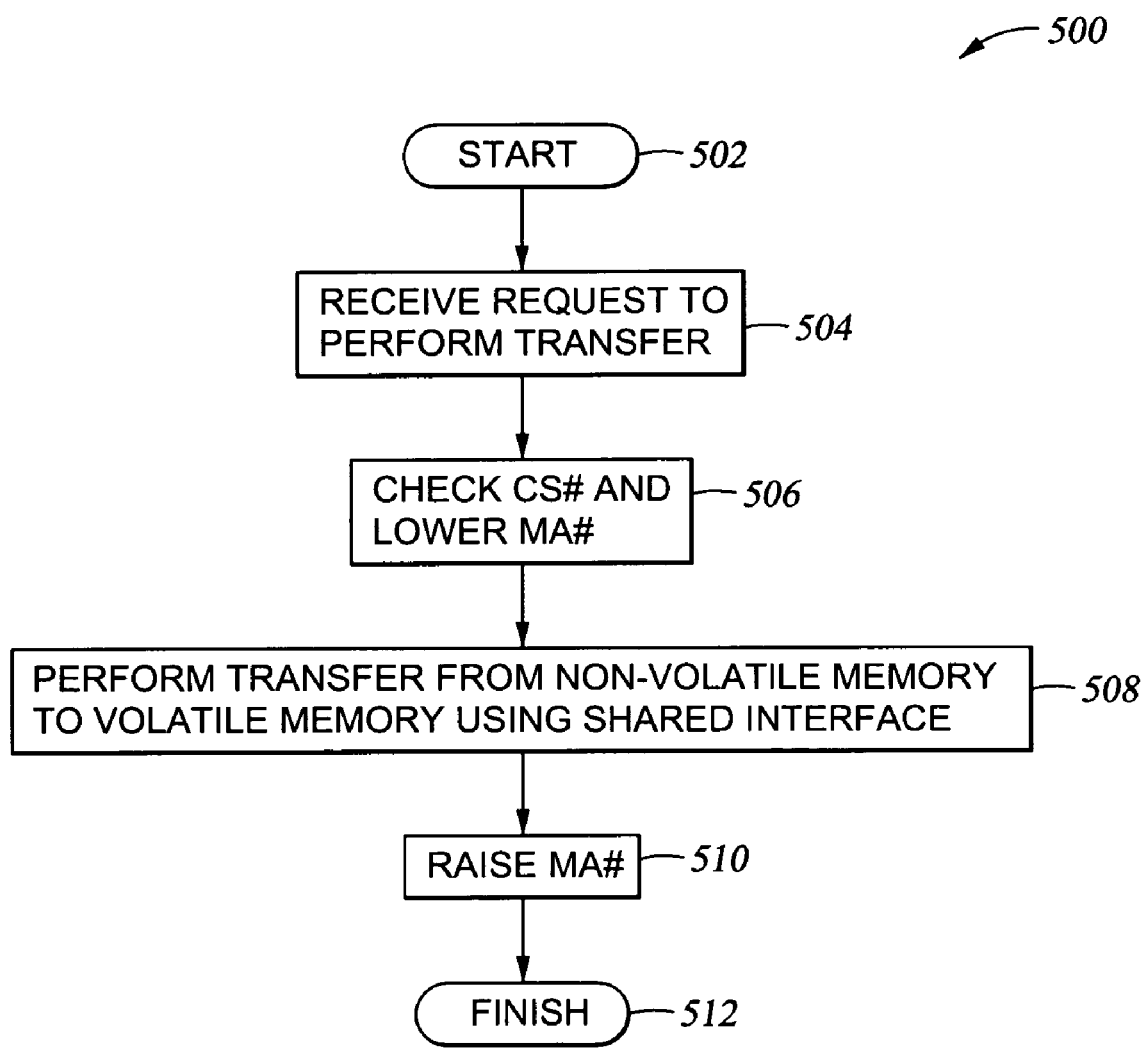
FIG. 5 is a flow diagram depicting a process for using the non-volatile memory controller to access volatile memory via the shared interface according to one embodiment of the invention.

FIG. 5 is a flow diagram depicting a process 500 for using the non-volatile memory controller 106 to access volatile memory 104 via the shared interface 140 according to one embodiment of the invention. The process may begin at step 502 and continue to step 504 where a request is received to perform a transfer (e.g., of data between non-volatile memory 108 and the volatile memory 104). At step 506, the non-volatile memory controller 106 may check CS# and lower the MA# signal if CS# is a high logic level (e.g., implying that the host 102 is not using the shared bus), thereby indicating that the non-volatile memory controller 106 is becoming master of the shared interface 140. After the non-volatile memory controller 106 becomes master of the shared interface 140, the non-volatile memory controller 106 may perform a transfer from the non-volatile memory 108 (e.g., using the non-volatile memory interface 132) to the volatile memory 104 using the shared interface 140. The non-volatile memory controller 106 may transfer the data, for example, from an asynchronous parallel port of the non-volatile memory controller 106 to an asynchronous parallel port of the volatile memory 104. The asynchronous port may also be referred to as a slow port, for example, because data from the asynchronous port is asynchronously transferred to and from the port, e.g., by asserting and lowering transfer signals, which may be slower than a synchronous port which utilizes a clock signal to transfer data.

After the non-volatile memory controller 106 has completed the transfer, the non-volatile memory controller 106 may raise the MA# signal, thereby indicating that the non-volatile memory controller 106 is no longer master of the shared interface 140. The process 500 may then finish at step 512.

Because the non-volatile memory controller 106 may in some cases be used to both receive commands and data (e.g., access commands from the host 102) and issue commands and data (e.g., access commands to the volatile memory 104), some of the non-volatile memory controller 106 connections to the shared interface 140 may be input-output connections (e.g., bidirectional connections which may either act as inputs or outputs). Thus, for example, each of the non-volatile memory controller connections 322 may be input-output connections. Optionally, only a portion of the non-volatile memory controller connections 322 may be bidirectional (e.g., the pins needed to control access to an asynchronous port of the volatile memory 104, such as WE#, ALE, RE#, and the IO[15:0] bus).

Performing DMA Transfers with the Shared Interface

According to one embodiment of the invention, the shared interface 140 may be utilized to perform DMA transfers, e.g., from the non-volatile memory 106 to the volatile memory 104. Also, in some cases, DMA transfers may be performed from the volatile memory 108 to a buffer in the non-volatile memory controller 106, as described below. By transferring code and/or data from volatile memory 108 to non-volatile memory 104 or to a buffer, the code and/or data may, in some cases, be accessed more quickly (e.g., by the host 102) because of the access time of the volatile memory 104 which is typically faster than the access time of the non-volatile memory 108. In some cases, such transfers may be referred to as code shadowing, because the data transferred may remain in both the non-volatile memory 108 and the volatile memory 104 while being accessed from the volatile memory 104.

As an example of utilizing the shared interface to perform DMA transfers, the host 102 may, in one embodiment, utilize the shared interface 140 to issue DMA commands to the non-volatile memory controller 106 requesting a DMA transfer e.g., from a location in the non-volatile memory 106 to a location in the volatile memory 104. Each DMA command may include, for example, a source location in the non-volatile memory 108, a destination location in the volatile memory 104, and a size of the code to be transferred.

When the non-volatile memory controller 106 receives a DMA command, the non-volatile memory controller 106 may assume control of the shared interface 140 (e.g., by lowering the MA# signal). The non-volatile memory controller 106 may then perform the DMA transfer (e.g., utilizing the DMA circuitry 130) from the source location in the non-volatile memory 108 to the destination location in the volatile memory 104. After the DMA transfer is complete, the non-volatile memory controller 106 may then relinquish control of the shared interface 140 (e.g., by raising the MA# signal) and allow the host 102 to access the requested data from volatile memory 104 via the shared interface 140.

In some cases, the non-volatile memory controller 106 may perform DMA transfers from the non-volatile memory 108 to a buffer in the non-volatile memory controller 106. For example, as described above with respect to FIG. 1, the non-volatile memory controller 106 may contain a boot code buffer 120 and a controller code buffer 126. During a boot sequence (e.g., after the system 100 is powered-on or reset) the non-volatile memory controller 106 may be configured to automatically copy boot code from the non-volatile memory 108 to the boot code buffer 120. The host 102 may then access the boot code buffer 120 via the shared interface 140 and use to boot code to perform initialization operations for the system 100. The non-volatile memory controller 106 may also be configured to automatically copy controller codes from the non-volatile memory 108 to the controller code buffer 126. The controller codes may then be utilized by the controller core 128 to perform controller operations.

Simultaneous Access to the Volatile Memory with the Shared Interface

In one embodiment of the invention, the shared interface 140 may be utilized to perform multiple, simultaneous accesses to the volatile memory 104. By allowing multiple, simultaneous accesses to the volatile memory 104, utilization of the volatile memory 104 and the effective memory bandwidth (e.g., the speed at which data may be read from and written to the volatile memory 104) may be increased.

For example, a first access command may be issued to a first bank in the volatile memory via a first portion of the shared interface 140. While the first access command is being performed, a second access command may be issued to a second bank in the volatile memory via a second portion of the shared interface 140. In some cases, by issuing separate commands via separate portions of the shared interface 140 and by issuing commands which utilize separate control hardware (e.g., the first command may be a read command while the second command may be a write command, or vice versa) and access separate portions of the volatile memory 104 (e.g., separate banks may be accessed), simultaneous accesses to the volatile memory 104 may be successfully performed, for example, without contention on any lines of the shared interface and/or without contention for resources of the volatile memory 104.

Figure 6:
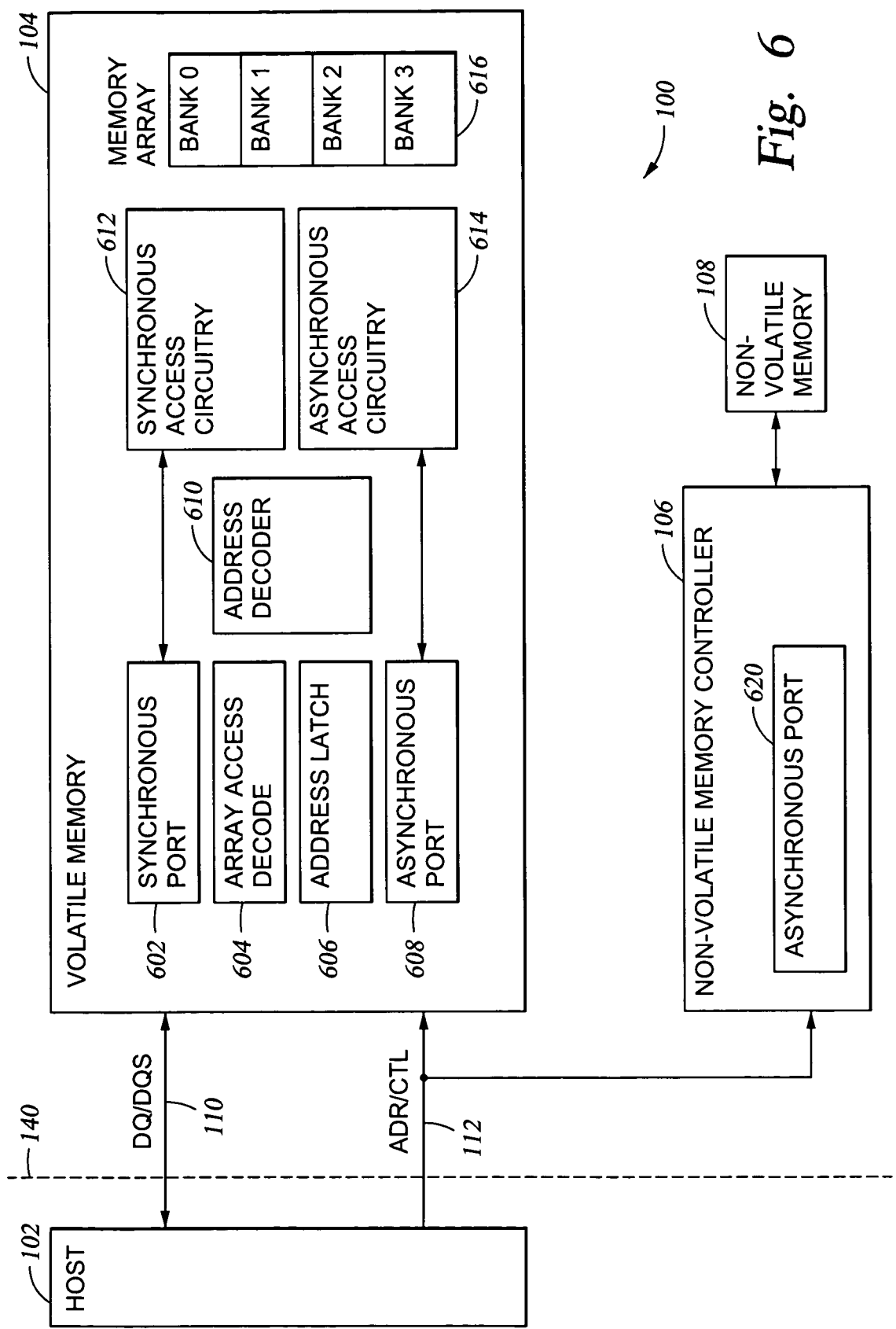
FIG. 6 is a block diagram depicting hardware for performing simultaneous accesses to a volatile memory via a shared interface according to one embodiment of the invention.

FIG. 6 is a block diagram depicting hardware for performing simultaneous accesses to a volatile memory 104 via a shared interface 140 according to one embodiment of the invention. As depicted, the volatile memory 104 may include a synchronous port 602 (e.g., a fast port), array access decode circuitry 604, address latch circuitry 606, and an asynchronous port 608 (e.g., a slow port). As previously described, the asynchronous port 608 of the volatile memory 104 may be connected to an asynchronous port 620 of the non-volatile memory controller 106 The synchronous port 602 may be connected to the synchronous serial connection 110 of the shared interface 140. The array address decoder circuitry 604 may be utilized to determine which memory array 616 and bank (e.g., bank 0, bank 1, bank 2, bank 3, etc.) is accessed by a given access command. The address latch circuitry 606 may be utilized to latch addresses being accessed (e.g., an address provided by the host 102 or the non-volatile memory controller 106 via the shared address and control lines 112 of the shared interface 140).

The volatile memory 104 may also include an address decoder 610, synchronous access circuitry 612, and asynchronous access circuitry 614. The address decoder 610 may be utilized to decode addresses latched by the address latch circuitry 606. The synchronous access circuitry 612 may be utilized to perform data accesses via the synchronous port 602 and the asynchronous access circuitry 614 may be utilized to perform data accesses via the asynchronous port 608.

As an example of performing synchronous accesses to the volatile memory 104, the volatile memory 104 may receive and latch (e.g., using address latch circuitry 606) the address for a first read command from the host 102 via the shared interface 140. After the read command is received, the read command may be decoded (e.g., using the array access decode circuitry 604 and the address decoder 610). The read command may then be performed, e.g., from bank 0 of the memory array 616 using the synchronous access circuitry 612 and the synchronous port 602 to transfer the data being read by the host 102.

While the read command is being performed, a write command may be received from the non-volatile memory controller 106 (e.g., a command writing data from non-volatile memory 108 to the volatile memory 104) via the shared interface 140. The volatile memory 104 may receive and latch (e.g., using address latch circuitry 606) the address for a first write command from the host 102 via the shared interface 140. After the write command is received, the write command may be decoded (e.g., using the array access decode circuitry 604 and the address decoder 610). The write command may then be performed, e.g., from bank 2 of the memory array 616 using the asynchronous access circuitry 612 and the asynchronous port 602 to transfer the data being written to the volatile memory 104. Thus, the first read command and the first write command may be simultaneously performed.

In some cases, the non-volatile memory controller 106 may issue commands before the host 102 issues simultaneous commands. Also, in some cases, the non-volatile memory controller 106 may perform a read while the host 102 performs a write. Optionally, other commands may be issued and performed simultaneously by the volatile memory 104 in addition to access commands, e.g., refresh commands or commands which modify a mode register of the volatile memory 104.

While the foregoing is directed to embodiments of the present invention, other and further embodiments of the invention may be devised without departing from the basic scope thereof, and the scope thereof is determined by the claims that follow.

What is claimed is:

1. A method for accessing a non-volatile memory controller and a volatile memory via a shared interface, comprising:
   selecting one of the non-volatile memory controller and the volatile memory via shared control signals of the shared interface, wherein the shared control signals are issued to the non-volatile memory controller and the volatile memory;
   issuing commands to the selected one of the non-volatile memory controller and the volatile memory via the shared control signal; and
   detecting a master signal asserted by the non-volatile memory controller, wherein the master signal indicates that the non-volatile memory controller is acting as master of the shared interface while the non-volatile memory controller transfers data between a non-volatile memory and the volatile memory.

2. The method of claim 1, further comprising:
   receiving data from the selected one of the non-volatile memory controller and the volatile memory.

3. The method of claim 2, wherein the non-volatile memory controller is selected, wherein the commands are issued to the non-volatile memory controller via the shared control signals, and wherein the data is received via an asynchronous port of the non-volatile memory controller.

4. The method of claim 2, wherein the volatile memory is selected, wherein the commands are issued to the volatile memory via the shared control signals, and wherein the data is received via a synchronous port of the volatile memory.

5. A method for accessing a non-volatile memory via a non-volatile memory controller, the method comprising:
   issuing an access command to the non-volatile memory via a non-volatile memory interface;
   receiving data via the non-volatile memory interface;
   transferring the received data using shared control signals of a shared interface, wherein the shared control signals are issued to a host processor and a volatile memory, and wherein the received data is transferred to one of the host processor and the volatile memory, wherein the received data is transferred to the volatile memory via an asynchronous port of the volatile memory; and
   before transferring the received data, asserting a master signal on the shared control signals of the shared interface, wherein the master signal indicates that the non-volatile memory controller is master of the shared interface.

6. The method of claim 5, further comprising:
   detecting a selection signal received via the shared control signals of the shared interface; and
   in response to the selection signal, receiving a first command via the shared control signals of the shared interface, wherein the access command is issued in response to the first command.

7. The method of claim 6, wherein the first command is issued by the host processor, and wherein the received data is transferred to the host processor in response to the first command.

8. The method of claim 5, wherein the transfer is a direct memory access (DMA) transfer performed in response to a first command from the host processor.

9. A system, comprising:
   a volatile memory;
   a non-volatile memory;
   a non-volatile memory controller configured to access the non-volatile memory via a non-volatile memory interface;
   a shared interface including shared control signals, wherein the shared control signals are received by the non-volatile memory controller and the volatile memory via the shared interface; and
   a host processor configured to:
      select one of the non-volatile memory controller and the volatile memory via the shared interface; and issue access commands via the shared controls signals of the shared interface to the selected one of the non-volatile memory controller and the volatile memory;
wherein the non-volatile memory controller is further configured to:
 determine if the non-volatile memory controller is selected by the host processor;
 if so:
  receive the access commands via the shared control signals of the shared interface; and
  access data in the non-volatile memory in response to receiving the access commands; and
 in response to receiving the access commands:
  assert a master signal indicating that the non-volatile memory controller is master of the shared interface; and
  perform a DMA transfer of the accessed data from the non-volatile memory to the volatile memory via an asynchronous port of the volatile memory.

10. The system of claim 9, wherein the volatile memory is configured to:
 determine if the volatile memory is selected by the host processor; and
 if so:
  receive the access commands via the shared control signals of the shared interface; and
  transfer data to the host processor via a synchronous port.

11. The system of claim 9, wherein the non-volatile memory controller is further configured to transfer the accessed data to the host processor via an asynchronous port of the host processor.

12. A non-volatile memory controller, comprising:
 a non-volatile memory interface;
 a shared interface for receiving shared control signals issued by a host processor to a non-volatile memory and a volatile memory; and
 circuitry configured to:
  determine if the shared control signals indicate that the non-volatile memory controller is selected via the shared interface;
  if so:
   receive access commands via shared control signals of the shared interface;
   in response to receiving the access commands, issue access commands to the non-volatile memory via the non-volatile memory interface; and
   receive requested data from the non-volatile memory via the non-volatile memory interface;
 wherein the circuitry is further configured to:
  transfer the requested data to the host processor via the shared interface;
  transfer the requested data to the volatile memory via an asynchronous port of the volatile memory; and
  before transferring the requested data to the volatile memory, assert a master signal on the shared control signals of the shared interface wherein the master signal indicates that the non-volatile memory controller is master of the shared interface.

13. A volatile memory, comprising:
 shared control signals received via a shared interface;
 a synchronous port;
 an asynchronous port; and
 circuitry configured to:
  receive first commands via the shared control signals;
  in response to receiving the first commands via the shared control signals, transfer data via the synchronous port;
  receive second commands via the shared control signals; and
  in response to receiving the second commands via the shared control signals, transfer data via the asynchronous port;
 wherein the volatile memory is configured to perform accesses for the first and second commands simultaneously.

14. The volatile memory of claim 13, wherein the volatile memory is configured to only receive the first and second commands when the shared control signals indicate that the volatile memory is selected.

15. The volatile memory of claim 13, wherein the volatile memory is configured to perform accesses for the first and second commands simultaneously when the first commands access a first memory bank and the second commands access a second memory bank.

16. A system, comprising:
 a volatile means for storing;
 a non-volatile means for storing;
 a means for controlling configured to access the non-volatile means for storing via a non-volatile means for memory interfacing;
 a shared means for interfacing including shared control signals, wherein the shared control signals are received by the means for controlling and the volatile means for storing via the shared means for interfacing;
 a means for processing configured to:
  select one of the means for controlling and the means for storing; and
  issue access commands via the shared controls signals of the shared means for interfacing to the selected one of the means for controlling and the volatile means for storing;
 wherein the means for controlling is further configured to:
  determine if the means for controlling is selected by the means for processing;
  if so:
   receive the access commands via the shared control signals of the shared means for interfacing; and
   access data in the non-volatile means for storing in response to receiving the access commands; and
  in response to receiving the access commands:
   assert a master signal indicating that the means for controlling is master of the shared means for interfacing; and
   perform a DMA transfer of the accessed data from the non-volatile means for storing to the volatile means for storing via an asynchronous means for transferring of the volatile means for storing.

17. The system of claim 16, wherein the volatile means for storing is configured to:
 determine if the volatile means for storing is selected by the means for processing; and
 if so:
  receive the access commands via the shared control signals of the shared means for interfacing; and
  transfer data to the means for processing via a synchronous means for transferring.

18. The system of claim 17, wherein the means for controlling is further configured to transfer the accessed data to the means for processing via an asynchronous means for transferring of the means for processing.

19. A method for accessing a non-volatile memory controller and a volatile memory via a shared interface, comprising:
- selecting one of the non-volatile memory controller and the volatile memory via shared control signals of the shared interface, wherein the shared control signals are issued to the non-volatile memory controller and the volatile memory;
- issuing commands to the selected one of the non-volatile memory controller and the volatile memory via the shared control signals;
- receiving data from the selected one of the non-volatile memory controller and the volatile memory, wherein the data is received via an first port of the non-volatile memory controller when the non-volatile memory controller is selected and wherein the data is received via a second port of the volatile memory when the volatile memory is selected; and
- detecting a master signal asserted by the non-volatile memory controller, wherein the master signal indicates that the non-volatile memory controller is acting as master of the shared interface while the non-volatile memory controller transfers data between a non-volatile memory and the volatile memory.

20. The method of claim 19, wherein the first port is a slow port and wherein the second port is a fast port, wherein the fast port provides a faster data transfer rate relative to the slow port.

21. The method of claim 19, wherein the first port is an asynchronous port and wherein the second port is a synchronous port.

22. A system, comprising:
- the non-volatile memory controller of claim 12;
- the non-volatile memory; and
- a plurality of electrical components; wherein the non-volatile memory controller, the non-volatile memory and the plurality of electrical components are at least one of structurally and functionally related.

23. A system, comprising:
- the volatile memory of claim 13;
- a host processor; and
- a plurality of electrical components; wherein the volatile memory, the host processor, and the plurality of electrical components are at least one of structurally and functionally related.

* * * * *